United States Patent [19]
Kimura et al.

[11] Patent Number: 5,424,383
[45] Date of Patent: Jun. 13, 1995

[54] ROOM TEMPERATURE CURABLE COMPOSITION CONTAINING A HYDROLYZABLE SILYL GROUP-CONTAINING POLYMER AND EPOXY COMPOUND

[75] Inventors: Tsuneo Kimura, Annaka; Kazukiyo Nagai, Kawasaki; Masatoshi Arai, Annaka, all of Japan

[73] Assignee: Shin-Etsu Chemical Co., Ltd., Tokyo, Japan

[21] Appl. No.: 101,695

[22] Filed: Aug. 4, 1993

[30] Foreign Application Priority Data

Aug. 4, 1992 [JP]  Japan .................................. 4-227984
Aug. 4, 1992 [JP]  Japan .................................. 4-227985

[51] Int. Cl.$^6$ ...................... C08G 59/56; C08G 77/18; C08K 5/07; C08K 5/17
[52] U.S. Cl. ......................................... 528/12; 528/17; 528/18; 528/21; 528/22; 528/27; 528/33; 528/34; 528/38
[58] Field of Search ....................... 528/17, 18, 21, 22, 528/27, 33, 34, 38, 12; 522/14, 170, 172

[56] References Cited

U.S. PATENT DOCUMENTS

| | | | |
|---|---|---|---|
| 4,678,835 | 7/1987 | Chang et al. | 528/22 |
| 4,683,250 | 7/1987 | Mikami | 522/83 |
| 4,824,875 | 4/1989 | Gutek | 522/14 |
| 4,975,471 | 12/1990 | Hayase et al. | 522/14 |
| 4,981,728 | 1/1991 | Homma et al. | 528/27 |
| 4,988,778 | 1/1991 | Chang et al. | 528/27 |
| 5,180,771 | 1/1993 | Arai et al. | 528/22 |

*Primary Examiner*—Susan W. Berman
*Attorney, Agent, or Firm*—Oblon, Spivak, McClelland, Maier & Neustadt

[57] ABSTRACT

Room temperature curable polymeric composition A room temperature curable polymeric composition comprising (A) at least one hydrolyzable silyl group-containing polymer selected from the group consisting of alkylene oxide polymers blocked by a hydrolyzable silyl group at a terminal end of molecular chain thereof and organopolysiloxanes blocked by a hydrolyzable silyl group at a terminal end of molecular chain thereof, (B) an epoxy compound, (C) a carbonyl group-containing organic compound, (D) an amino group-containing organic compound, and (E) a curing catalyst for the component (A). The composition is excellent in fast-curing property and deep portion curing property, and a cured product obtained therefrom has good rubber properties.

5 Claims, No Drawings

ROOM TEMPERATURE CURABLE COMPOSITION CONTAINING A HYDROLYZABLE SILYL GROUP-CONTAINING POLYMER AND EPOXY COMPOUND

BACKGROUND OF THE INVENTION

1. Field of the Invention

The present invention relates to a room temperature curable polymeric composition which is useful as constructional sealing material, coating material, encapsulating or potting material for electric and electronic components, fiber-treating agent, adhesive for automotive, constructional and electric or electronic uses, and so forth.

2. Description of the Prior Art

As a condensation-curing type room temperature curable composition comprising an alkylene oxide polymer or an organopolysiloxane as base polymer, there have been known those of one-pack type in which the amount of crosslinking agent is reduced to an utmost degree and crosslinking rate is enhanced by hydrolysis of hydrolyzable groups introduced into the base component and those of two-pack type in which a crosslinking agent and a curing agent are enclosed in separate packs.

However, the one-pack type compositions need a considerable length of time for curing to their deep portions, though they have a high rate of cure from the surface thereof. The two-pack type compositions are comparatively better in deep portion curing properties, but they are disadvantageous in that, because their two parts in separate packs are not formulated for a mixing ratio of 1:1 by volume or by weight, they are poorly processable in quantity measurement or mixing operations and are not well suited to use with mixing machines or the like. In the two-pack type compositions, furthermore, suitable ranges for addition amounts of crosslinking agent and curing agent necessary for complete cure to deep portions of the composition are very narrow and, accordingly, it is necessary to specify strictly the addition amounts of the crosslinking agent and curing agent or to add water as a deep portion curing agent.

Recently, curable compositions comprising as main constituents thereof a so-called crosslinkable silyl group-containing alkylene oxide polymer, i.e. an alkylene oxide polymer containing a hydrolyzable silyl group whose hydrolysis is accompanied by crosslinking, and an epoxy resin have been developed (See Japanese Pre-examination Patent Publication (KOKAI) Nos. 61-268720 (1986), 62-283120 (1987), 2-145674 (1990), 2-145675 (1990) and 2-228365 (1990)). In this type of compositions, crosslinking and curing of the crosslinkable silyl group-containing alkylene oxide polymer proceeds separately from that of the epoxy resin. Namely, the crosslinkable silyl group-containing alkylene oxide polymer is cured by crosslinking which results from formation of siloxane linkages under the action of moisture, whereas the epoxy resin is cured by crosslinking which accompanies catalytic opening of epoxy rings.

Major uses of these curable compositions include, for example, application as an adhesive for areas where aseismatic properties are required in the fields of electric and electronic industry and construction materials. In such applications, the curable compositions are required to have high cure rate and adhesive strength, and cured products thereof are required to be elastic.

However, the above-mentioned curable compositions comprising a crosslinkable silyl group-containing alkylene oxide polymer and an epoxy resin as main components need a considerable length of time for curing to deep portions thereof, because the silyl group-containing polymer is cured by moisture in air. On the other hand, where water is preliminarily added to the curable composition in order to shorten the period of time necessary for deep-portion curing, shelf life of the composition is lowered.

SUMMARY OF THE INVENTION

It is accordingly an object of the present invention to provide a room temperature curable composition having excellent fast-curing property and deep portion curing property.

The above object is attained according to the present invention by a curable composition comprising a crosslinkable silyl group-containing alkylene oxide polymer or a crosslinkable silyl group-containing polyorganosiloxane, and an epoxy resin as major components thereof wherein water needed for crosslinking and curing of the crosslinkable group-containing polymeric compound is produced in the composition by reaction between a carbonyl group-containing organic compound and a primary amino group-containing organic compound.

Namely, the present invention provides a room temperature curable polymeric composition comprising:
(A) at least one hydrolyzable silyl group-containing polymer selected from the group consisting of alkylene oxide polymers blocked by a hydrolyzable silyl group at a terminal end of molecular chain thereof and organopolysiloxanes blocked by a hydrolyzable silyl group at a terminal end of molecular chain thereof;
(B) an epoxy compound;
(C) a carbonyl group-containing organic compound;
(D) an amino group-containing organic compound; and
(E) a curing catalyst for the component (A).

The composition according to the present invention is excellent in fast-curing property and deep portion curing property, and cured products obtained therefrom have good rubber properties.

DETAILED DESCRIPTION OF PREFERRED EMBODIMENTS (A) Hydrolyzable Silyl Group-Containing Polymer The component (A), serving as base polymer of the composition according to the present invention, may be a hydrolyzable silyl group-containing alkylene oxide polymer or a hydrolyzable silyl group-containing organopolysiloxane or both of these polymers.

(A-1) Hydrolyzable Silyl Group-Containing Alkylene Oxide Polymer

The alkylene oxide polymer is blocked by a hydrolyzable silyl group at a terminal end of its molecular chain. The hydrolyzable silyl group contained in the alkylene oxide polymer includes, for example, those groups having the following general formula (1):

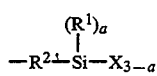

wherein $R^1$ is a substituted or unsubstituted monovalent hydrocarbon group such as, for example, alkyl groups such as methyl, ethyl, propyl and the like, cycloalkyl groups such as cyclohexyl and the like, alkenyl groups such as vinyl, allyl and the like, aryl groups such as phenyl, tolyl and the like, and groups derived from these groups by substitution of part of their hydrogen atoms with halogen atom or the like; $R^2$ is a divalent hydrocarbon group such as methylene, ethylene, propylene or decene group, $-CH_2CH_2C_6H_4CH_2-$ group and the like; X is a hydrolyzable group selected from alkenyloxyl groups such as isopropenyloxyl, isobutenyloxyl and the like, ketoxime groups such as dimethyl ketoxime group, methyl ethyl ketoxime group and the like, alkoxyl groups such as methoxyl, ethoxyl, butoxyl and the like, acyloxyl groups such as acetoxyl and the like, amino groups such as N-butylamino, N,N-diethylamino and the like, aminoxyl groups such as N,N-diethylaminoxyl and the like, amide groups such as N-methylacetamide group and the like, carboxyl group and the like; and a is an integer from 0 to 2, with the proviso that where two $R^1$ groups are present they may be the same or different, and where two or more X groups are present they may be the same or different. Where a plurality of such terminal hydrolyzable groups are present, they may be the same or different from each other.

Among the hydrolyzable silyl groups having the general formula (1) above, preferred are those containing an alkenyloxyl group as X. Namely, where the hydrolyzable silyl group contains an alkenyloxyl group as X in the general formula (1), hydrolysis thereof and the subsequent condensation produces a ketone which can serve as component (C), whereby the amount of the component (C) originally present in the composition can be reduced and the amount of condensation products formed by hydrolysis can be controlled. Specific examples of the hydrolyzable silyl groups of the general formula (1) containing an alkenyl group as X include the groups of the following general formulas (2-1), (2-2) and (2-3):

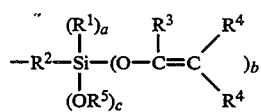

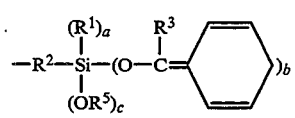

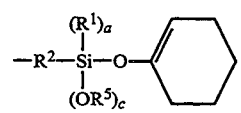

wherein $R^1$, $R^2$ and a are the same as defined above; $R^3$ is a $C_1$ to $C_6$ alkyl group such as methyl, ethyl, propyl and isobutyl, an aryl group such as phenyl, an alkenyl group such as vinyl, or the like; $R^4$ may be the same or different from each other and each are a hydrogen atom, a $C_1$ to $C_6$ alkyl group such as methyl, ethyl and propyl, phenyl group, or the like; $R^5$ is a $C_1$ to $C_6$ alkyl group such as methyl, ethyl, n-propyl, iso-propyl and t-butyl, phenyl group or the like; b is an integer from 1 to 3; and c is an integer from 0 to 3, provided the sum a+b+c is 3. Among these hydrolyzable silyl groups, particularly preferred are those of the general formula (2-1) and those of the general formula (2-3), wherein in the formulas $R^1$ is methyl, $R^2$ is $-C_3H_6-$, $R^3$ is methyl, $R^4$ is hydrogen, $R^5$ is methyl.

The alkylene oxide polymers terminated by a hydrolyzable silyl group of the general formula (2-1), (2-2) or (2-3) can be prepared, for example, by the following two methods.

In a first method, an alkylene oxide polymer having an unsaturated group, e.g. vinyl or allyl group, at a terminal end thereof is brought into contact with a silane compound having the following general formula (3):

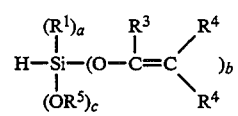

wherein $R^1$ $R^3$ to $R^5$ a b and c are the same as defined above, to effect addition reaction (hydrosilylation) between the terminal unsaturated group and the silane compound in the presence of a platinum catalyst, as is known in the art.

According to a second method, an alkylene oxide polymer containing a hydrolyzable silyl group at a terminal end thereof having the following general formula (4):

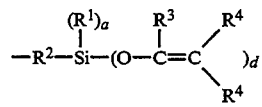

wherein $R^1$, $R^2$, $R^3$, $R^4$ and a are the same as defined above, and d is an integer from 1 to 3, provided the sum a+d is 3, is reacted with an alcohol having the general formula $R^5$-OH (where $R^5$ is the same as defined above) in the presence of a basic compound such as triethylamine.

The backbone chain of the alkylene oxide polymer is comprised of alkylene oxide units, specific examples of which include

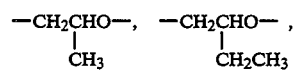

and the like. The backbone chain may be constituted of only one kind of the structural units or be constituted of two or more kinds of the structural units. Among the structural units, particularly preferred is the $-CH_2CH(CH_3)O-$ unit. In addition to the alkylene oxide units, the backbone chain of the alkylene oxide polymer may contain other structural units in an amount of up to 3% by mole. The other structural units than the alkylene oxide units include, for example,

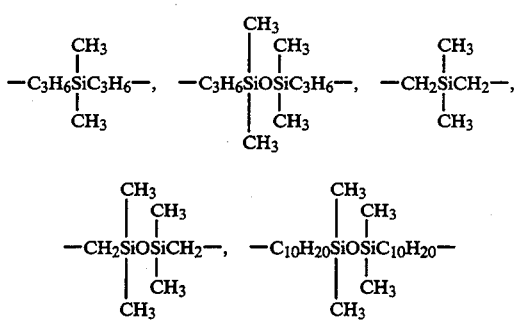

and the like.

The molecular chain of the alkylene oxide polymer may have a linear, branched or cyclic configuration or a combination of these configurations.

The molecular weight of the alkylene oxide polymer is not particularly limited, provided the crosslinking by crosslinkable silyl groups takes place. From the viewpoint of availability, however, the molecular weight may normally range from 2,000 to 20,000.

(A-2) Hydrolyzable Silyl Group-Containing Organopolysiloxane

The organopolysiloxane is blocked by a hydrolyzable silyl group at a terminal end of its molecular chain, and serve as a major component of the composition according to the present invention.

The organopolysiloxane includes, for example, polysiloxanes having the following general formula (5):

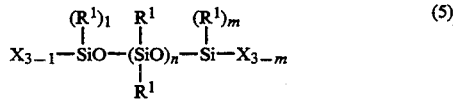

wherein $R^1$ and X are the same as above-defined, 1 and m may be the same or different from each other and each are an integer from 0 to 2, and n is an integer of 10 or above. Where a plurality of terminal hydrolyzable groups are present, they may be the same or different from each other.

Of the organopolysiloxanes of the general formula (5), those containing an alkenyloxyl group as X are preferred in view of formation of a ketone, which can serve as component (C), through hydrolysis and the subsequent condensation. The formation of ketone makes it possible to reduce the amount of the component (C) originally present in the composition and to control the amount of condensation products formed by hydrolysis.

The organopolysiloxane as component (A) preferably has a viscosity at 25° C. of from 25 to 1,000,000 cSt, more preferably from 1,000 to 100,000 cSt.

(B) Epoxy Compound

The component (B) may be any of known epoxy compounds, there being no special restrictions. For example, glycidyl ether-bisphenol A type epoxy resins, glycidyl ether-bisphenol F type epoxy resins, glycidyl ether-tetrabromobisphenol A type epoxy resins, novolak type epoxy resins, m-aminophenol type epoxy resins, diaminodiphenylmethane epoxy resins, urethane-modified epoxy resins, alicyclic epoxy resins, aliphatic epoxy resins, N,N-diglycidylaniline, triglycidyl isocyanurate, polyalkylene glycol glycidyl ethers, polysiloxane glycidyl ethers, polysilane glycol glycidyl ethers, epoxy-modified siloxane compounds (available under the trade names of KF105, X-22-163A, X-22-163B, X-22-163C, KF100T, KF101, X-22-169AS, X-22-169B, KF-102 and KF103, from Shin-Etsu Chemical Co., Ltd.) and so forth. Among these epoxy compounds, preferred are Epikote 828 and 827 (tradenames for products by Yuka Shell K.K.) and KF100T and KF102 (tradenames for products by Shin-Etsu Chemical Co., Ltd.). In order to ensure that three-dimensional crosslinking proceeds smoothly to give a satisfactory cured product, the epoxy compound of component (B) preferably has at least two epoxy groups in its molecule.

The amount of the epoxy compound (B) is preferably such that, where the total amount of the components (A) and (B) is 100 parts by weight, the weight ratio of component (A) to component (B) is in the range from 1:99 to 99:1, more preferably from 80:20 to 50:50.

(C) Carbonyl Group-Containing Organic Compound

The organic compound containing a carbonyl group (C=O) reacts with the organic compound having a primary amino group ($NH_2$ group) of component (D) to form water, which acts as a deep portion curing agent for the composition.

The carbonyl group-containing compound includes, for example, ketones such as acetone, methyl ethyl ketone, acetophenone, cyclohexanone and the like; esters such as ethyl acetate, butyl acetate, methyl propionate, ethyl acrylate, butyrolactone and the like; amides such as dimethylformamide, diethylacetamide, butyrolactam and the like; carboxylic acids such as acetic acid, propionic acid, benzoic acid and the like; silane coupling agents having a carbonyl group-containing portion of the just-mentioned compounds as a functional group; carbonyl group-containing polymers and oligomers, and the like. Among these compounds, preferred are acetone and cyclohexanone.

The carbonyl group-containing compounds as above may be used either singly or in combination of two or more.

The amount of the component (C) in the composition is preferably in the range from 0.001 to 1 mole, more preferably from 0.01 to 0.1 mole, per 100 parts by weight of the components (A) and (B) in total. If the amount of the component (C) is too small, the composition does not show a satisfactory deep portion curing property at the time of curing thereof. If the amount of the component (C) is too large, on the other hand, an elastic cured product of the composition is softer and lower in strength, as compared to that obtained where the amount of the component (C) is at a suitable level.

(D) Amino Group-Containing Organic Compound

The component (D) has both a characteristic property for reacting with the carbonyl group-containing organic compound (C) to form water which acts as a deep portion curing agent, as described above, and a characteristic property for acting as a curing agent for the epoxy compound of component (B).

The primary amino group-containing organic compound includes, for example, primary amines such as methylamine, ethylamine, butylamine, ethylenediamine, triethylenetetramine, aniline, 4,4'-diaminodiphenyl ether and the like; amino group-containing organosilicon compound such as silane coupling agent having a primary amino group as a functional group, such as gamma-aminopropyltriethoxysilane and the like; aliphatic polyamines; and primary amino group-containing polymers or oligomers such as primary amino group-containing alkylene oxide polymers, primary amino group-containing polysiloxanes and the like.

Among these compounds, amino group-containing organosilicon compounds are particularly preferable in that the resulting composition shows good rubber-like elasticity properties upon cure. Such amino group-containing organosilicon compounds include, for example, those compounds which have a basic skeleton composed of one or more types of structures exemplified by the following general formulas (6)

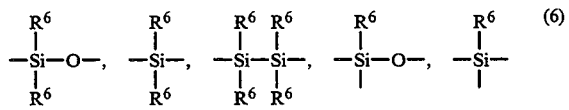

wherein $R^6$ is an alkyl group such as methyl and ethyl, an aryl group such as phenyl, an alkenyl group such as vinyl and allyl, an alkoxyl group such as trifluoropropyl, methoxyl, ethoxyl and isopropoxyl, an amino group, an aminoxyl group, acetoxyl group or the like, and the like and which contain a primary amino group linked to the skeleton by a linking group. The amino group-containing organosilicon compound may be linear, branched or cyclic in molecular configuration, or may have a combination of these configurations. Besides, there are no special restrictions on the molecular weight of the amino group-containing organosilicon compounds. Specific examples of the amino group-containing organosilicon compound include the compounds represented by any of the following structural formulas:

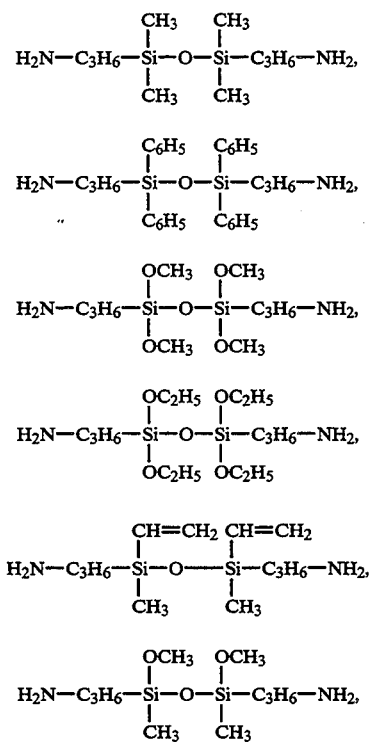

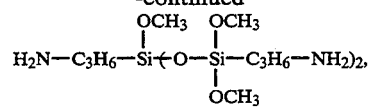

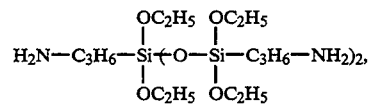

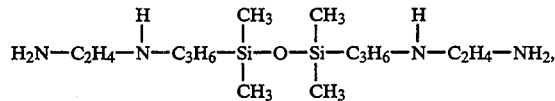

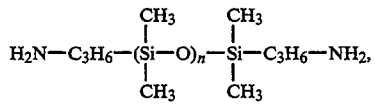

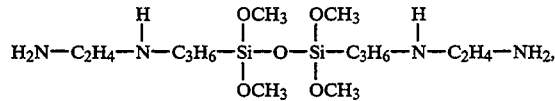

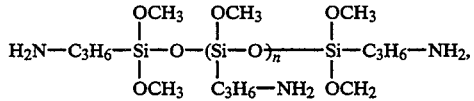

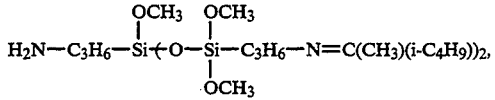

and the like, and the compounds commercially available under the tradenames of KF393, KF859, KF86, KF861, KF867, KF869, KF880, KF8002, KF8004, KF8005, KF864, KF865, KF868 and KF8003 (products by Shin-Etsu Chemical Co., Ltd.).

The amino group-containing organic compounds as above may be used either singly or in combination of two or more. From the viewpoint of cure rate of the composition, in particular, where an organic compound containing only one primary amino group in its molecule is used it is preferable to use together an organic compound containing two or more primary amino groups in its molecule.

The amount of the component (D) in the composition is preferably in the range from 0.01 to 200 parts by weight per 100 parts by weight of the component (B). Taking into special account the cure rate of the composition, long-term shelf life of the composition in uncured state, economy and the like, a more preferable range for the amount of the component (D) is from 5 to 50 parts by weight.

For accelerating the curing of the epoxy compound of component (B), if necessary, a compound capable of curing the epoxy compound may be contained in the composition of the present invention, in addition to the component (D). The compounds capable of curing the epoxy compound include, for example, amine compounds (exclusive of primary amines) such as aliphatic polyamines, polyamide resins, dicyandiamide, imidazole tertiary amines, amino group-containing organosilicon compounds and the like, acid anhydride compounds, phenolic resins, mercaptane compounds, dicyandiamide, Lewis acid complex compounds and so on.

These compounds may be used either singly or in combination of two or more.

Among the above compounds, amino group-containing organosilicon compounds are particularly preferable for the resulting composition to exhibit rubber-like elasticity upon cure. Such amino group-containing organosilicon compounds include, for example, the compounds which have a basic skeleton composed of one or more types of structures exemplified by the above general formulas (6) and the like and which contain an amino group linked to the skeleton either directly or through a linking group. The amino group here may be any of secondary and tertiary amino groups. The amino group-containing organosilicon compound may be linear, branched or cyclic in configuration, or may have a combination of these configurations. There are no special restrictions on the molecular weight of the amino group-containing organosilicon compounds.

The basic forms which the amino group linked to the above-described skeleton can have includes, for example, the forms of

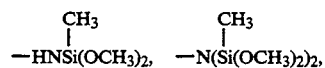

and the like groups, and the form of a piperidine group. The amino groups in such forms are linked to the basic skeleton through a linking group which may be an alicyclic group, an aromatic group, an aliphatic group or a combination thereof. Specifically, preferable examples of the amino group-containing organosilicon compounds include the followings.

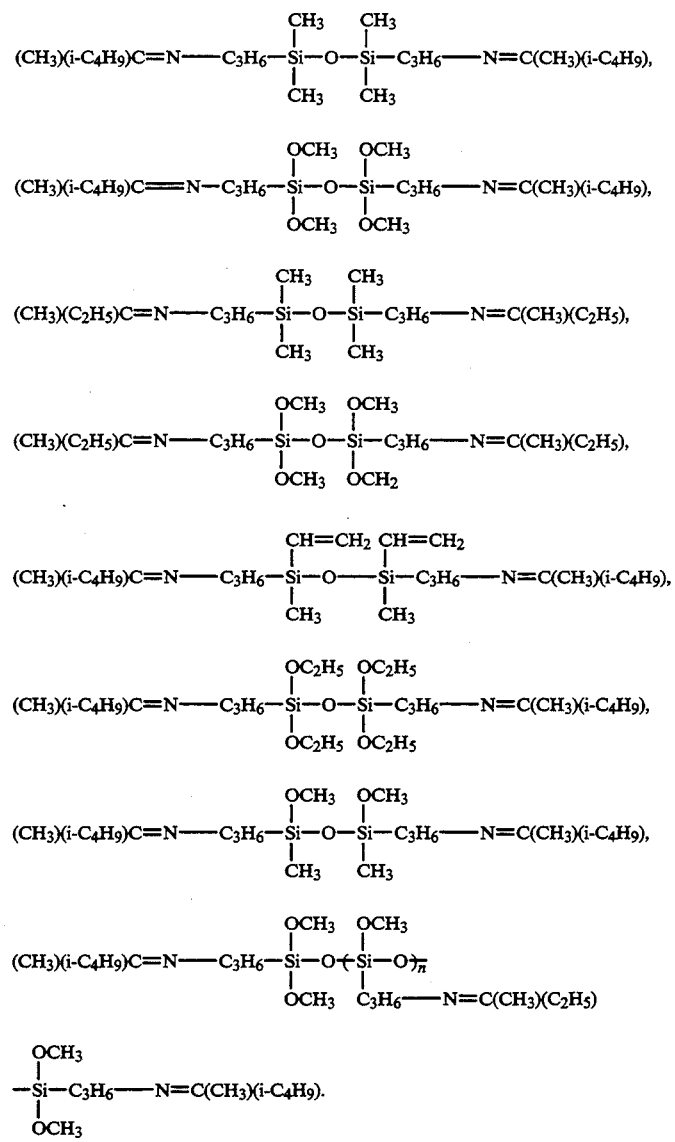

Where these compounds capable of curing the epoxy composition of component (B) are contained in the composition of the present invention in addition to the component (D), the total amount of these compounds and the component (D) is preferably in the range from 0.01 to 200 parts by weight per 100 parts by weight of the component (B). Taking into special consideration the cure rate of the composition, long-term shelf life of the composition in uncured state, economy and the like, a more preferable range for said total amount is from 5 to 50 parts by weight.

(E) Curing Catalyst for Hydrolyzable Silyl Group-Containing Polymer(A)

As the component (E), which is a curing catalyst for the hydrolyzable silyl group-containing polymer (A), tin catalysts and titanium catalysts can be used, for example. More specifically, the component (E) includes, for example, organic tin compounds such as tin naphthenate, tin caprate, tin oleate, dibutyltin diacetate, dibutyltin dioctate, dibutyltin dilaurate, dibutyltin dioleate, diphenyltin diacetate, dibutyltin oxide, dibutyltin dimethoxide, dibutylbis(triethoxysiloxy)tin, dibutyltin benzyl maleate and the like; and titanic esters or titanium chelate compounds such as tetraisopropoxytitanium, tetra-n-butoxytitanium, tetrabis(2-ethylhexoxy)titanium, dipropoxybis(acetylacetonato)titanium, titanium isopropoxyoctylene glycol and the like.

Furthermore, in order to enhance the activity of the above catalyst, a basic compound may be used together. Basic compounds which can be used for this purpose include, for example, amines such as octylamine, laurylamine and the like, cyclic amines such as imidazoline, tetrahydropyrimidine, 1,8-diazabicyclo(5,4,0)undecene-7 and the like, guanidyl group-containing silane compounds such as guanidine propyltris(trimethylsiloxy)silane or a partial hydrolyzates thereof, guanidyl group-containing siloxanes and so forth.

The amount of the catalyst (E) is preferably from 0.1 to 10 parts by weight per 100 parts by weight of the component (A). Taking the cure rate of the composition, long-term shelf life of the composition in uncured state, economy and the like into special account, a more preferable range for the amount of the catalyst (E) is from 0.5 to 5 parts by weight.

Other Ingredients

In addition to the above components (A) to (E), the room temperature curable composition of the present invention may contain other various ingredients, as desired. For example, stabilizers such as methyltrimethoxysilane, methyltripropenoxysilane, vinyltributanoximesilane, methyltriacetoxysilane and the like, reinforcing agents such as fumed silica, precipitated silica, aluminum oxide, ground quartz, carbon powder, talc, bentonite and the like, fibrous fillers such as asbestos, glass fibers, organic fibers and the like, coloring agents such as pigments, dyes and the like, heat resistance improving agents such as red oxide, cerium oxide and the like, cold resistance improving agents, dehydrating agents, adhesion-improving agents such as gamma-glycidoxypropyltriethoxysilane and the like, liquid reinforcing agents such as network polysiloxanes comprised of triorganosiloxy units and SiO2 units, and the like can be added to the composition. These ingredients may be added in desired amounts, as required.

Preparation of Composition

The composition according to the present invention can be obtained as a one-pack type room temperature curable composition by uniformly mixing desired amounts of the components (A) to (E) and the optional ingredients added as required, in a dry atmosphere. In this case, the component (C) or (D) may be mixed in a microencapsulated state, whereby a one-pack type room temperature curable composition with improved shelf life can be obtained. Alternatively, the composition of the present invention can be obtained as a two-pack type composition, namely, a composition consisting of two parts which are contained in separate packs and are mixed with each other at the time of use of the composition. Where the composition is prepared as the two-pack type, the two parts in separate packs can be easily formulated for a mixing ratio of 1:1, resulting in good workability.

Use

The composition according to the present invention, in view of fast-curing property and deep portion curing property thereof, is useful as constructional sealing material, coating material, encapsulating or potting material for electric and electronic components, fiber-treating agent, adhesive for automotive, constructional and electric or electronic uses, and so forth. Particularly, the composition is effective for use as an oil seal material in the manufacture of automobiles where high fast-curing property and deep portion curing property are required, and as a sealing material or potting material in electric and electronics industry where rationalization of manufacturing steps is demanded in recent years.

In the curing of the composition according to the present invention, the carbonyl group possessed by the component (C) and the primary amino group present in the component (D) react with each other as represented by the following formula:

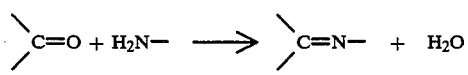

to form water, which is utilized as a deep portion curing agent in the system where it is formed, whereby fast-curing property and deep portion curing property of the composition are markedly enhanced.

Thus, the composition according to the present invention has the advantage of easy formulation for a 1:1 mixing ratio where the composition is prepared as a two-pack type composition. Furthermore, the composition of the present invention is highly suited to practical use because the components for forming water (which acts as a deep portion curing agent, as described above), namely, the carbonyl group containing organic compound and the primary amino group-containing organic compound are both easily available.

EXAMPLES

The working examples of the present invention and comparative examples will now be described below.

Synthesis Example 1

To 100 g of an allyl group-terminated polypropylene glycol (molecular weight: 8,000) having been azeotropically dehydrated using 100 g of toluene, were added 6.2 g of diisopropenyloxymethylsilane and 0.5 g of H2PtCl6 as catalyst, and the resulting mixture was reacted at 80° C. for 4 hours. The reaction was finished after the consumption of 95% of the Si-H groups of the starting silane was confirmed by Si-H value measurement using an alkali decomposition method. The reaction mixture thus obtained was heated under a reduced pressure to remove volatile components therefrom, whereby the reaction product was obtained as a substantially transparent viscous liquid. The reaction product had a molecular weight of 8,300. NMR and IR absorption spectroscopic analyses and determination of isopropenyloxysilyl group by an alkali decomposition method revealed that 95% of the hydroxysilyl groups of the starting silane had been added to the terminal allyl groups of the polypropylene glycol. For convenience, the reaction product obtained in this Synthesis Example 1 will be referred to as "Polymer A".

Synthesis Example 2

A mixture of 100 g of Polymer A with 100 g of methanol and 50 g of triethylamine was reacted with heating at reflux for 10 hours. Removal of volatile components from the resulting reaction mixture by heating under a reduced pressure gave the reaction product as a substantially transparent viscous liquid.

The product obtained had a molecular weight of 8,200. NMR and IR absorption spectroscopic analyses and determination of isopropenyloxysilyl group and methoxysilyl group by an alkali decomposition method revealed that the molar ratio of isopropenyloxysilyl groups to methoxysilyl groups was 52:48. For convenience, the reaction product obtained in this Synthesis Example 2 will be referred to as "Polymer B".

Synthesis Example 3

To 100 g of an allyl group-terminated polypropylene glycol (molecular weight: 8,000) having been azeotropically dehydrated using 100 g of toluene, were added 4.1 g of dimethoxymethylsilane and 0.5 g of $H_2PtCl_6$ as catalyst, and the resulting mixture was reacted at 80° C. for 4 hours. The reaction was finished after the consumption of 95% of the Si-H groups of the starting silane was confirmed by Si-H value measurement using an alkali decomposition method. The reaction mixture thus obtained was heated under a reduced pressure to remove volatile components therefrom, whereby the reaction product was obtained as a substantially transparent viscous liquid.

The reaction product had a molecular weight of 8,200. NMR and IR absorption spectroscopic analyses and determination of methoxysilyl group by an alkali decomposition method revealed that 95% of the hydroxysilyl groups of the starting silane had been added to the terminal allyl groups of the polypropylene glycol. For convenience, the reaction product obtained in this Synthesis Example 3 will be referred to as "Polymer C".

Examples 1 to 12, Comparative Examples 1 to 4

In each of these Examples and Comparative Examples, one of Polymers A, B and C obtained respectively in Synthesis Examples 1 to 3 above were mixed with other constituents for composition in specific proportions, as set forth in Tables 1 and 2, to give a composition. Each composition thus obtained was formed into a sheet-like shape, 2 mm in thickness, which was left to stand in an atmosphere of 20° C. and 60% relative humidity. After 24 hours, the cured product obtained was tested to measure hardness, tensile strength and elongation according to JIS K 6301. Hardness measurement was carried out using a Type A spring hardness tester.

The results are given in Tables 1 and 2.

Deep portion curing property was evaluated by placing each composition in a 10-mm deep plastic vessel and, after 2 hours, measuring the cured thickness of deep portion of the composition (the thickness of the cured composition layer as measured depthwise from the surface).

TABLE 1

| Composition | Example 1 | Example 2 | Example 3 | Comp. Ex. 1 | Example 4 | Example 5 | Example 6 | Comp. Ex. 2 |
|---|---|---|---|---|---|---|---|---|
| Constituents (parts by weight): | | | | | | | | |
| Polymer A | 60 | — | — | — | 60 | — | — | — |
| Polymer B | — | 60 | — | — | — | — | — | — |
| Polymer C | — | — | 60 | 60 | — | 60 | 60 | 60 |
| Acetone | 0.3 | 0.5 | 1 | — | — | 1 | — | — |
| Cyclohexanone | — | — | — | — | 0.3 | — | 1 | — |
| 2,4,6-Trisdimethylphenyl ether | 6 | 6 | 6 | 6 | — | — | — | — |
| Tetraethyltetramine | — | — | — | — | 5 | 5 | 5 | 5 |
| Bis(p-guanidylphenyl)propane | 40 | 40 | 40 | 40 | 40 | 40 | 40 | 40 |
| Dibutyltin dimethoxide | 2 | 2 | 2 | 2 | 2 | 2 | 2 | 2 |
| Gamma-aminopropyl—triethoxysilane | 2 | 2 | 2 | 2 | 1 | 1 | 1 | 1 |
| Physical properties: | | | | | | | | |
| Hardness | 53 | 49 | 50 | 49 | 40 | 41 | 42 | 40 |
| Tensile strength (kgf/cm$^2$) | 45 | 44 | 44 | 43 | 35 | 33 | 36 | 34 |
| Elongation (%) | 380 | 370 | 370 | 390 | 280 | 270 | 300 | 290 |
| Cured thickness of deep portions (mm) | 10 | 10 | 10 | 1 | 10 | 10 | 10 | 1 |

TABLE 2

| Composition | Example 7 | Example 8 | Example 9 | Comp. Ex. 3 | Example 10 | Example 11 | Example 12 | Comp. Ex. 4 |
|---|---|---|---|---|---|---|---|---|
| Constituents (parts by weight): | | | | | | | | |
| Polymer A | 60 | — | — | — | 60 | — | — | — |
| Polymer B | — | 60 | — | — | — | 60 | — | — |
| Polymer C | — | — | 60 | 60 | — | — | 60 | 60 |
| Acetone | 0.3 | 0.3 | 1 | — | 0.3 | 0.3 | — | — |
| Cyclohexanone | — | 0.2 | — | — | — | 0.2 | 1 | — |
| 2,4,6-Trisdimethylphenyl ether | — | — | — | — | — | — | — | — |

TABLE 2-continued

| Composition | Example 7 | 8 | 9 | Comp. Ex. 3 | Example 10 | 11 | 12 | Comp. Ex. 4 |
|---|---|---|---|---|---|---|---|---|
| Triethyltetramine | — | — | — | — | — | — | — | — |
| Compound (A)*2 | — | — | — | — | 40 | 40 | 40 | 40 |
| Compound (B)*2 | 40 | 40 | 40 | 40 | — | — | — | — |
| Bis(p-guanidylphenyl)-propane | — | — | — | — | — | — | — | — |
| KF100T (products by Shin-Etsu Chemical Co., Ltd.) | 40 | 40 | 40 | 40 | — | — | — | — |
| KF102 | — | — | — | — | 40 | 40 | 40 | 40 |
| Dibutyltin dimethoxide | 2 | 2 | 2 | 2 | 2 | 2 | 2 | 2 |
| Gamma-aminopropyl-triethoxysilane | 1 | 1 | 1 | 1 | 1 | 1 | 1 | 1 |
| Physical properties: | | | | | | | | |
| Hardness | 38 | 36 | 31 | | 35 | 32 | 28 | |
| Tensile strength (kgf/cm$^2$) | 31 | 33 | 27 | (bad*1 cure) | 31 | 31 | 29 | (bad*1 cure) |
| Elongation (%) | 460 | 430 | 450 | | 470 | 460 | 410 | |
| Cured thickness of deep portions (mm) | 10 | 10 | 10 | 1 | 10 | 10 | 10 | 1 |

Notes
*1: In Comparative Examples 3 and 4, the composition was separated into parts at the time of curing, and satisfactory cured product was not obtained in a target length of time (24 hours).
*2: Compounds (A) and (B) have the following structures, respectively.

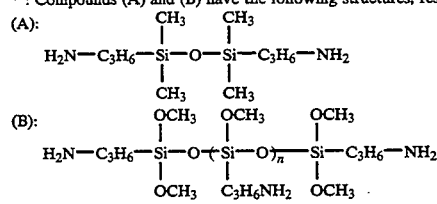

Examples 13 to 18, Comparative Examples 5 and 6

In each of these Examples and Comparative Examples, a dimethylpolysiloxane blocked by vinyldiisopropenyloxysilyl group at both terminal ends of its molecular chain and having a viscosity of 2,000 cSt at 25° C. (Polymer A), a dimethylpolysiloxane blocked by vinyldiisopropenyloxysilyl group at both terminal ends of its molecular chain and having a viscosity of 8,000 cSt at 25° C. (Polymer B) and a dimethylpolysiloxane blocked by trimethoxysilyl group at both terminal ends of its molecular chain and having a viscosity of 8,000 cSt (Polymer C) were mixed together with other several components in specific proportions, as set forth in Table 3, to give a composition. Each composition thus obtained was formed into a sheet-like shape, 2 mm in thickness, which was left to stand in an atmosphere of 20° C. and 60% relative humidity. After 24 hours, the cured product obtained was tested to measure hardness, tensile strength and elongation according to JIS K 6301. Hardness measurement was carried out using a Type A spring hardness tester.

The results are given in Table 3.

Deep portion curing property was evaluated by placing each composition in a 10-mm deep plastic vessel and, after 2 hours, measuring the cured thickness of deep portion of the composition (the thickness of the cured composition layer as measured depthwise from the surface).

TABLE 3

| Composition | Example 13 | 14 | 15 | Comp. Ex. 5 | Example 16 | 17 | 18 | Comp. Ex. 6 |
|---|---|---|---|---|---|---|---|---|
| Constituents (parts by weight): | | | | | | | | |
| Polymer A | 70 | — | — | — | 70 | | | |
| Polymer B | — | 70 | — | — | — | | | |
| Polymer C | — | — | 70 | 70 | — | 70 | 70 | 70 |
| Acetone | 0.3 | 0.5 | 1 | — | — | 1 | — | — |
| Cyclohexanone | — | — | — | — | 0.3 | — | 1 | — |
| 2,4,6-Trisdimethyl-phenyl ether | 6 | 6 | 6 | 6 | — | — | — | — |
| Tetraethyltetramine | — | — | — | — | 5 | 5 | 5 | 5 |
| Bis(p-guanidylphenyl)-propane | 30 | 30 | 30 | 30 | 30 | 30 | 30 | 30 |
| Dibutyltin dimethoxide | 2 | 2 | 2 | 2 | 2 | 2 | 2 | 2 |
| Gamma-aminopropyl-triethoxysilane | 2 | 2 | 2 | 2 | 1 | 1 | 1 | 1 |
| Physical properties: | | | | | | | | |
| Hardness | 42 | 41 | 38 | 39 | 40 | 36 | 38 | 36 |

TABLE 3-continued

| Composition | Example 13 | Example 14 | Example 15 | Comp. Ex. 5 | Example 16 | Example 17 | Example 18 | Comp. Ex. 6 |
|---|---|---|---|---|---|---|---|---|
| Tensile strength (kgf/cm$^2$) | 28 | 30 | 29 | 19 | 32 | 21 | 29 | 18 |
| Elongation (%) | 490 | 380 | 360 | 410 | 350 | 370 | 390 | 380 |
| Cured thickness of deep portions (mm) | 10 | 10 | 10 | 2 | 10 | 10 | 10 | 1 |

We claim:

1. A room temperature curable polymeric composition, comprising:

A) at least one hydrolyzable silyl group-containing polymer selected from the group consisting of alkylene oxide polymers blocked by a hydrolyzable silyl group at a terminal end of a molecular chain thereof and organopolysiloxanes blocked by a hydrolyzable silyl group at a terminal end of a molecular chain thereof, wherein said hydrolyzable silyl group has the formula:

$$-R^2-\underset{\underset{X_{3-a}}{|}}{\overset{(R^1)_a}{Si}}\quad (1)$$

wherein $R^1$ is selected from the group consisting of methyl, ethyl, propyl, cyclohexyl, vinyl, allyl, phenyl, tolyl and any one of the same substituted by halogen; $R^2$ is selected from the group consisting of methylene, ethylene, propylene, decene and $-CH_2CH_2C_6H_4CH_2-$; and X is selected from the group consisting of isopropenyloxyl, isobutenyloxy, methyl ethyl ketoxime group, dimethyl ketoxime group, methoxyl, ethoxyl, butoxyl, acetoxyl, N-butylamino, N,N-diethylamino, N,N-diethylaminoxyl, N-methylacetamide group and carboxyl group; and wherein a is an integer of from 0 to 2; with the proviso that where the two $R^1$ groups are present, said groups are the same or different, and where two X groups are present, said groups are the same or different;

B) an epoxy compound;
C) a ketone;
D) an amino group-containing organic compound; and
E) a curing agent for said compound A) and
wherein said components C) and D) react to form water, which acts as a deep portion curing agent; and said component D) acts as a curing agent for the epoxy compound of component E).

2. The composition of claim 1, wherein said ketone C) is acetone or cyclohexanone.

3. The composition of claim 1, wherein the hydrolyzable silyl group of component (A) forms a ketone by hydrolysis.

4. The composition of claim 1, wherein the amino group-containing organic compound of component (D) is an organosilicon compound containing at least two primary amino groups in its molecule.

5. A cured product obtained by curing the composition as defined in claim 1.

* * * * *